United States Patent [19]

Gleeson

[11] 4,155,067

[45] May 15, 1979

[54] AUTOMOBILE ALARM DEVICE

[76] Inventor: Patrick F. Gleeson, P.O. Box 31, Campbellville, Ontario, Canada, L0P 1B0

[21] Appl. No.: 826,992

[22] Filed: Aug. 23, 1977

[51] Int. Cl.² ............................................. B60R 25/10
[52] U.S. Cl. ..................................... 340/65; 340/539; 340/566; 200/61.52
[58] Field of Search ...................... 340/63, 64, 65, 224, 340/261, 276, 280; 180/114; 200/61.45 R, 61.52

[56] References Cited

U.S. PATENT DOCUMENTS 2,075,040 3/1937 Kieber ................................ 340/52 H
3,562,706 2/1971 Mason ..................................... 340/65

Primary Examiner—Alvin H. Waring

[57] ABSTRACT

An alarm device for detecting movement of parked automobiles provides a support for mounting on an automobile. An outer member defines a ring having an inner surface of conducting material. A helical spring is attached to the support to suspend the ring in an attitude where the ring defines an aperture in cross-section. An inner member having an outer surface of conducting material is connected by a flexible connection to the support to be suspended in said outer member and spaced from the inner surface thereof.

3 Claims, 3 Drawing Figures

AUTOMOBILE ALARM DEVICE

This invention relates to an alarm actuating switch or disturbances sensitive device for mounting on a motor vehicle which switch will be activated upon movement of the motor vehicle.

The invention relates to that art where an alarm switch or disturbance sensitive device includes an inner member flexibly suspended from a support in spaced transverse relationship to an outer datum member. The support is mounted on an automobile. If an automobile is moved or vibrated to a sufficient extent the inner member will contact the datum member. This contact is used to close or otherwise activate an electrical circuit or other alarm. (It should be mentioned that devices of the type to which the invention belongs are not customarily used on owner driven automobiles but are rather customarily used on automobile dealer lots where the car will rest until driven away by a buyer).

Prior art known to the applicant is as follows:
U.S. Pat. No. 3,597,753; Aug. 3, 1971; Tabankin
U.S. Pat. No. 2,884,623; Apr. 28, 1959; Stelter
U.S. Pat. No. 3,056,951; Oct. 6, 1962; Tooni
U.S. Pat. No. 3,207,850; Sept. 21, 1965; Foreman
U.S. Pat. No. 3,492,426; Jan. 27, 1970; Foreman et al.
U.S. Pat. No. 3,500,376; Mar. 10, 1970; Cooper
U.S. Pat. No. 3,634,846; Jan. 11, 1972; Fogiel
U.S. Pat. No. 3,710,371; Feb. 18, 1970; Whalen The problem with the prior art devices, exemplified by Tabankin, was that the datum support was fixed so that the support measured deflection from a horizontal position. Thus, if the state mounting for the device was not horizontal, the alarm would be set off with less (or more) deflection from its static mounting position than that for which it was designed.

A further disadvantage of prior art devices is that they are actuated by approximately equal tilt or disturbance in any direction. In a device for mounting on an automobile it is desired that the device be relatively insensitive to disturbance or tilt of an automobile about a fore and aft axis but relatively sensitive to disturbance of an automobile about the normally transverse axis. (pitching).

This invention, is made more sensitive to pitching than to tilting about the fore and aft axis by providing a disturbance sensitive device mounted on an autumboile through a connection which allows pivotting of the disturbance sensitive device relative to the auto about the fore-and-aft axis of the auto but inhibits movement of the disturbance sensitive device about the transverse axis. In this way actuation of the disturbance sensitive device is inhibited for tilting or vibration of the automobile from side to side but is given full opportunity to operate for vibration or tilting about the normally horizontal transverse axis.

This invention further overcomes the disadvantages of the prior art devices by providing a resiliently flexible support for the datum member in the form of a downwardly extending helical spring, fixed at its upper attachment to a support and supporting a conductor ring at its lower end. Thus if the device is mounted on a tilt, the position of ring may deflect a limited amount with the compliance of such spring. An inner member is flexibly suspended to rest in the static position within such ring and electrical connections are arranged so that when the inner member contacts the ring an electrical connection is made to actuate the alarm. The flexibility of the helical spring allows the device to be mounted, somewhat off the horizontal and yet to assume a static position which will cause the device to operate satisfactorily. In other words, at a degree of tilt, not possible with the prior art devices, the device will allow a small disturbance without setting off the alarm but will operate to set the alarm on more than a predetermined amount of disturbance or deflection in any direction.

In drawings which illustrate a preferred embodiment of the invention:

Figure 1:
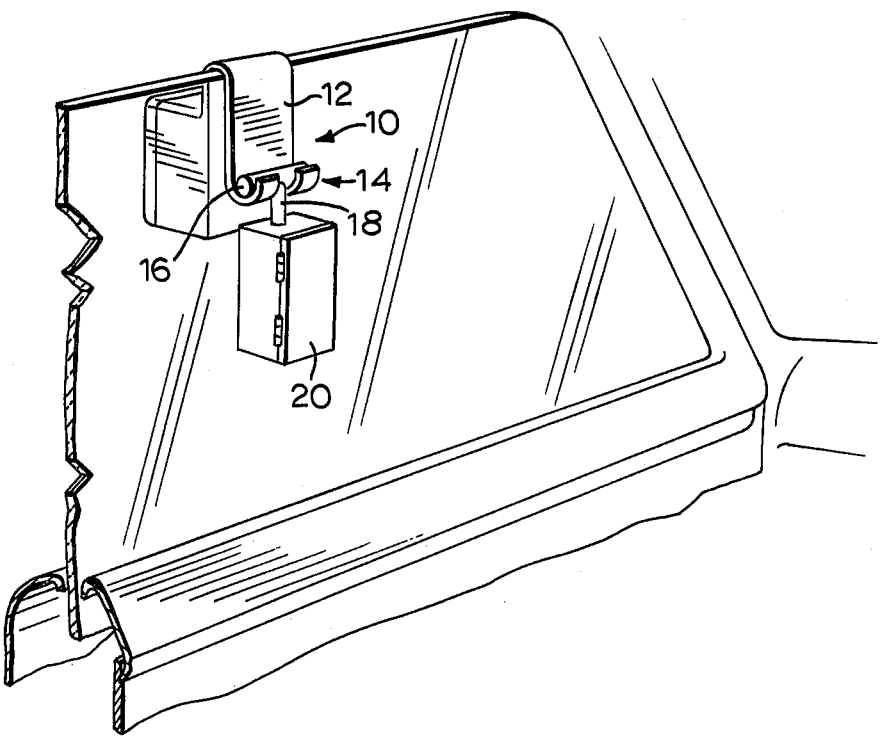
FIG. 1 shows the disturbance sensitive device mounted on an automobile window, the view is from inside the car.

In the drawings FIG. 1 shows a mount 10 for the voltage sensitive device including a flat member 12 bent in a 180° curve to fit snugly over the top edge of the side window of an automobile and to be received in the upper window well thereof when the window is raised. Member 12 is provided at its end inside the car with a bifurcated upwardly turned portion 14 which defines a rounded trough in which a cylindrical hanger 16 of the disturbance sensitive device may pivot about an axis approximately parallel to the fore-and -aft axis of the automobile. The slot between the bifurcation of portion 14 is dimensioned so that a shank 18 may extend vertically downward from hanger 16 when the hanger is in the trough.

Figure 2:
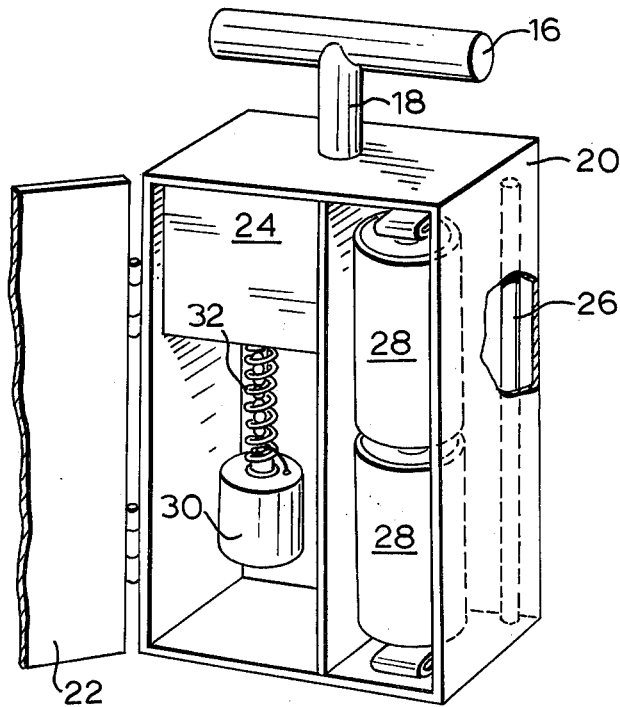
FIG. 2 shows the general arrangement of the disturbance sensitive device.
Figure 3:
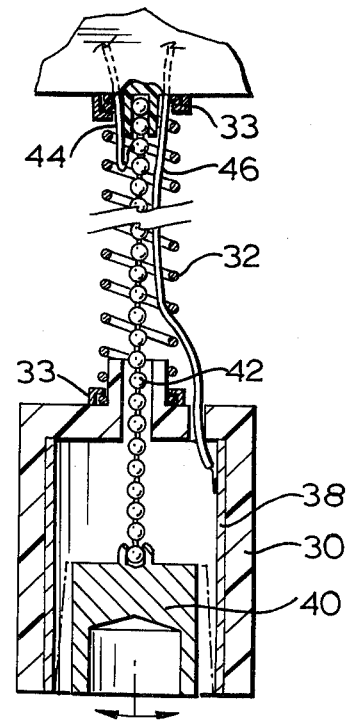
FIG. 3 shows a vertical cross-section of the disturbance sensitive device.

Suspended from the lower end of the shank 18 is the support for the voltage sensitive device comprising box 20 preferably of plastic and preferably provided with a door 22 to protect the operative portions of the disturbance sensitive device from the weather. In FIG. 2 a number of elements ancillary to the invention are shown schematically. The closed compartment 24 is designed to house a radio transmitter to be actuated by the switch to be described in connection with the disturbance sensitive device of the invention. Vertical bar 26 schematically represents the antenna for the transmitter while batteries 28 schematically represents the antenna for the transmitter while batteries 28 schematically represent the power supply for the transmitter and the switch to be described.

The switch in accord with the invention comprises an outer bell-like member 30 suspended by a helical spring 32 from the support, here from the lower wall of compartment 24 and attached to the lower wall in any desired manner such as by adhesive, solder or by flanges 33 as shown. The spring 32 is however so attached to the support that, at least part of the upper turn of the spring moves with the support. At its lower end spring 32 suspends a bell-like member 34 being attached thereto for such suspension by flanges 33 or in any known manner such as the alternatives listed above. The bell-like manner 30 is either of insulating material or is insulated from the electrical path to the inner or "striker" portion of the bell. Here the member 32 is formed of insulating material and provided with a conducting liner 38 on its inner surface.

A conducting inner member or striker 40 is flexibly suspended from the support (here the lower surface of box 24) to hang, approximately centrally disposed, inside conducting ring 38 when member 40's flexible suspension and helical spring 32 are vertically disposed. In the preferred embodiment, the flexible suspension of the central or striker member 40 is by a chain 42 similar to a lamp pull chain but the suspension may equally be by flexible cord or wire. Striker 40 will be electrically insulated from ring 38 in whatever manner is dictated by the material of the flexible suspension for striker 40 and by the support for conducting ring 38.

Electrical connections 44 and 46 to ring 38 and striker 40 are provided whereby the ring 38 and striker 40 act as electrical contacts to complete an electrical circuit (not shown) which will, when connected, actuate the radio circuit to transmit an alarm.

In operation, with the device mounted on an automobile and first assumed to dispose helical spring 32 and chain 42 vertically if the auto is subjected to lateral vibration, about its fore-and-aft axis, the support 20 deflects about the axis of hanger 16 and members 32 and 42 tend to continue to hang vertically and the switch contacts 40 and 38 do not connect unless the lateral vibration is excessive. In this way the chance of actuation of the alarm by the wind or contact by a person innocently examining the car is reduced. On the other hand pitching vibration of the car (i.e. about the normally horizontal transverse axis thereof) is transmitted by member 12 to hanger 16 and vibrates the support tending to cause connection of striker 40 and ring 38 to cause closing of the connection and actuation of the alarm. Thus attempts to enter or move the car are readily detected.

If the support is non-vertical when mounted on a car, the limited compliance of helical spring 32 and the flexibility of chain 42 maintain striker 40 approximately centered with respect to ring 38 and thus the device operates as above described over a range of deflections from its vertical disposition which range is subject to design control.

I claim:

1. An alarm device for detecting movement of parked automobiles comprising:
   a support for mounting on an automobile
   an outer member defining a ring having an inner surface of conducting material
   a helical spring connected at its upper end to said support and at its lower end to suspend said ring,
   said helical spring being arranged to extend with its axis substantially vertical when said automobile is horizontal and being designed when the axis of the upper end of the spring is tilted from the vertical, to flex so that the axis of the lower end of the spring is approximately vertical,
   a flexible member, connected at its upper end to said support, to hang down the center of said helical spring,
   said flexible member at its lower end supporting an inner member having an outer surface of conducting material
   said inner member being supported at a level where on transverse deflection of said inner member relative to said outer member an electrical connection is provided between said inner and outer members.

2. An alarm device for detecting movement of parked automobiles including:
   a disturbance sensitive device designed to complete an electrical connection upon disturbance or tilting of the device,
   means for mounting said disturbance sensitive device on the automobile which allows pivotting of said disturbance sensitive device relative to the auto about an axis approximately parallel to the fore and aft axis of the automobile and inhibits movement of said disturbance sensitive device about the normally horizontal transverse axis of the automobile.

3. An alarm device as claimed in claim 1, wherein said support is so mounted on an automobile to pivot relative to an axis approximately parallel to the fore and aft axis of the automobile but to be inhibited against pivotting relative to the normally horizontal transverse axis.

* * * * *